US006814773B2

(12) United States Patent
Shah et al.

(10) Patent No.: US 6,814,773 B2
(45) Date of Patent: Nov. 9, 2004

(54) EXPANDABLE MEDIA FILTER ASSEMBLY

(75) Inventors: Rajendra K. Shah, Indianapolis, IN (US); Dwight H. Heberer, Brownsburg, IN (US); Danny L. Jenkins, Camby, IN (US)

(73) Assignee: Carrier Corporation, Syracuse, NY (US)

( * ) Notice: Subject to any disclaimer, the term of this patent is extended or adjusted under 35 U.S.C. 154(b) by 31 days.

(21) Appl. No.: 09/972,502

(22) Filed: Oct. 9, 2001

(65) Prior Publication Data

US 2003/0066423 A1 Apr. 10, 2003

(51) Int. Cl.[7] .......................... B01D 46/10; B01D 29/07
(52) U.S. Cl. ............................. 55/497; 55/496; 55/499; 55/500; 55/501; 55/502; 55/521; 55/DIG. 31; 55/DIG. 5
(58) Field of Search .......................... 55/497, 496, 499, 55/500, 501, 502, 521, DIG. 5, DIG. 31

(56) References Cited

U.S. PATENT DOCUMENTS

| | | | | |
|---|---|---|---|---|
| 2,663,660 A | * | 12/1953 | Layte | 55/521 |
| 3,692,184 A | * | 9/1972 | Miller, Jr. et al. | 55/521 |
| 3,871,851 A | * | 3/1975 | Neumann | 55/521 |
| 3,999,964 A | * | 12/1976 | Carr | 55/521 |
| 4,885,015 A | * | 12/1989 | Goulet et al. | 55/521 |
| 4,963,171 A | * | 10/1990 | Osendorf | 55/521 |
| 5,167,740 A | * | 12/1992 | Michaelis et al. | 55/521 |
| 5,273,564 A | * | 12/1993 | Hill | 55/521 |
| 5,599,448 A | * | 2/1997 | Spearman | 55/521 |
| 5,743,927 A | * | 4/1998 | Osendorf | 55/521 |
| 6,464,745 B2 | * | 10/2002 | Rivera et al. | 55/521 |

* cited by examiner

Primary Examiner—Duane Smith
Assistant Examiner—Minh-Chau T. Pham
(74) Attorney, Agent, or Firm—Wall Marjama & Bilinski LLP

(57) ABSTRACT

An expandable media filter structure is composed largely of biodegradable materials and is environmentally disposable. A plurality of pleated panels are interconnected at their edges so as to be collapsible for storage and shipping purposes but expandable for installation and use. A plurality of ribbons are ultrasonically welded to each of the panels edges, with the ribbon portions between edges being of substantially equal lengths, thereby maintaining equal spacing between the panel edges when the filter is in the expanded condition but allowing an each collapsing of the filter for storage. Forming a part of the nondisposable framework for support of the disposable filter are a pair of end plates which are C-shaped in cross section for slidably receiving an end panel of the media filter therein. The depth of the C-shaped channel is sufficient to allow a plurality of the unexpended pleats to be stored therein so that a single sized filter may be used for various sizes of cabinet openings. The end plates include a pair of slots formed near their ends for attachment to a nondisposable support structure. The nondisposable support structure includes a pair of molded plastic side caps that fit over the respective ends of the filter panels and the end plates. Each side cap has pair of flanges at its opposite ends which act to maintain the filter in its expanded condition when the end plates are placed in abutting position therewith. Each side cap also includes a boss which fits into a respective end plate slot to hold the end plates in their installed positions within the side caps.

8 Claims, 4 Drawing Sheets

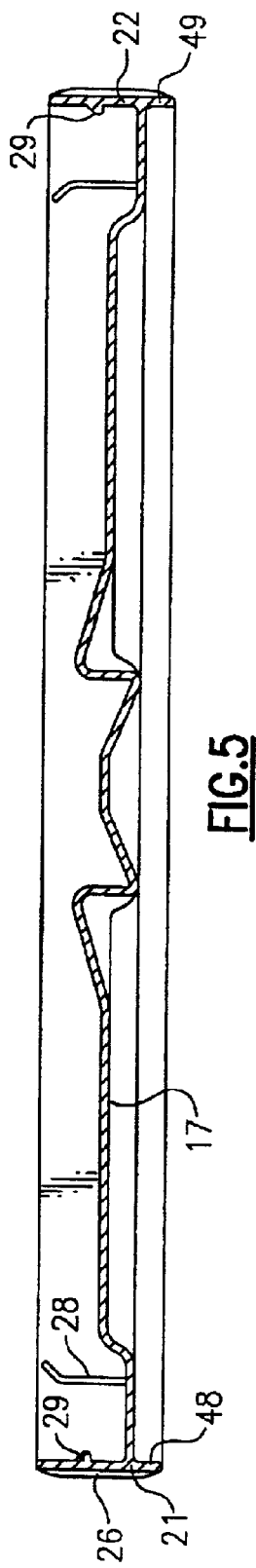
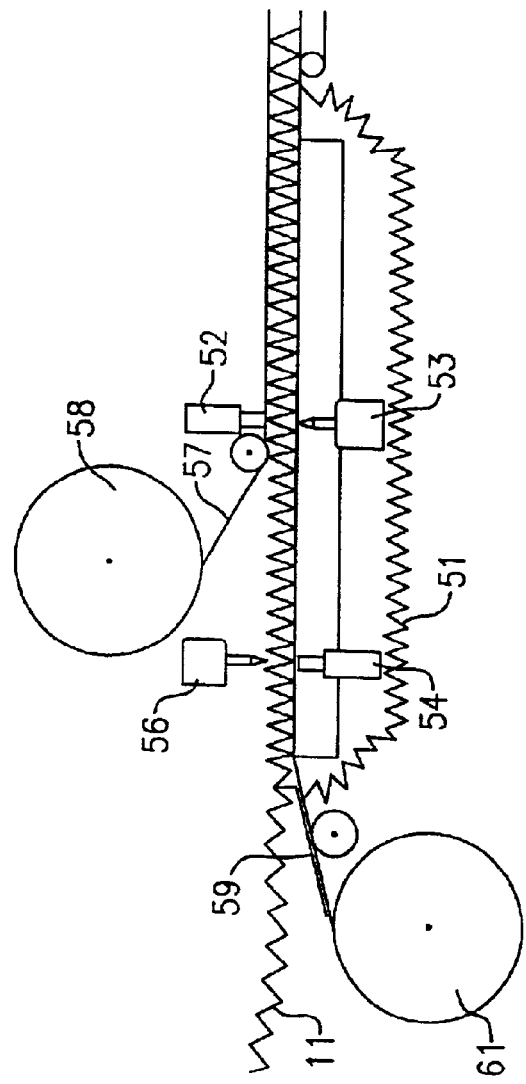

EXPANDABLE MEDIA FILTER ASSEMBLY

BACKGROUND OF THE INVENTION

The invention relates generally to air filters and, more particularly, to expandable air filters for use in furnaces.

The use of disposable air filters in the air distribution system of a building has provided an efficient and economical method of removing undesirable particulate matter from the air. In its simplest form, a rectangular piece of filter media material is mounted in a cardboard framework, with the combination then being mounted in a filter cabinet or an air duct somewhere in the air distribution system. With a hot air furnace, it is common practice to place the filter in a filter cabinet just upstream of the fan so as to filter the return air as it enters the furnace from the return air duct. When the filter is spent, i.e. when it has collected a sufficient amount of particulate matter as to be considered "full", then it is removed and replaced with a new filter.

One way to increase the surface area of a filter is to make it multi-dimensional, with a plurality of accordion-like pleats. Such a pleated media filter is thicker than a non pleated filter and therefore provides more active surface area, making it more effective and longer lasting. It can be rechargeable, i.e. cleanable, or disposable depending primarily on the type of material used for the filter media. A disposable material, however, tends to be less durable and strong, and many such materials will not be suitable for providing the necessary support structure that is necessary to secure and maintain the installed position of the disposable portion of the filter in the nondisposable support framework. Further, a homeowner should be able to simply and easily remove, replace and dispose of a dirty filter.

It would also be desirable for a serviceperson to have a single sized filter which can be used to accommodate various sizes of cabinet openings, such that his inventory can be substantially reduced to. Generally there are three sizes of filters that must be stocked and carried in order to meet the various installation requirements.

A pleated filter element may be selectively collapsed for storage and shipping purposes and then later expanded for installation and use. To accomplish this, it is necessary to provide some means to maintain the filter element in its expanded condition. It is also desirable to maintain substantially uniform spacing and angling of the pleats, and a comb-like, rigid framework has been used for that purpose.

It is therefore on object of the present invention to provide an improved furnace air filter and method of manufacture. That object and other features and advantages will become more readily apparent upon reference to the following descriptions when taken in conjunction with the appended drawings.

SUMMARY OF THE INVENTION

Briefly, in accordance with one aspect of the invention, a plurality of ribbons are placed on either side of the pleated filter element and are secured to the edges of the pleated panels with equal lengths of ribbon portions between the respective pleated panel edges such that, when the filter element is expanded, the expanded ribbon portions cause a uniform spacing and angling of the pleated panels to occur. An end plate is attached to each of the two end filter panels, and the ribbons are expanded and attached to the end plates.

In accordance with another aspect of the invention, the ribbons are secured to the pleated panel edges by way of ultrasonic welding. Such a process provides for an efficient, economical, and effective method of bonding the ribbons to the panel edges.

By yet another aspect of the invention, the filter element is maintained in its expanded condition by a pair of side caps which form the framework for, and to which the two end plates of the filter element are attached. The side caps each have a pair of spaced flanges over which the respective filter element end plates are stretched so as to maintain a minimum expanded length of the filter element, and a pair of bosses engage with corresponding slots in the end plates to hold them in their installed positions.

In accordance with still another aspect of the invention, the end plates, which form part of the disposable portion of the filter, are formed of a plurality of laminated layers which are adhesively bonded and compressed together into a U-shaped structure that provides the necessary strength and rigidity to support the expanded filter in its installed position.

By a further aspect of the invention, the end plates do not form an integral part of the of the disposable filter element and include hanger elements which permit the storage of unexpanded portions of the filter it, such that a single sized filter can be used for multiple sized openings, with the unneeded portions thereof being stored within the end plates.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 5 is a sectional view of an alternative embodiment of a side cap portion of the filter structure.

FIG. 6 is a schematic illustration of an ultrasonic bonding process used in the manufacture of the filter structure in accordance with the present invention.

DESCRIPTION OF THE PREFERRED EMBODIMENT

Figure 1:
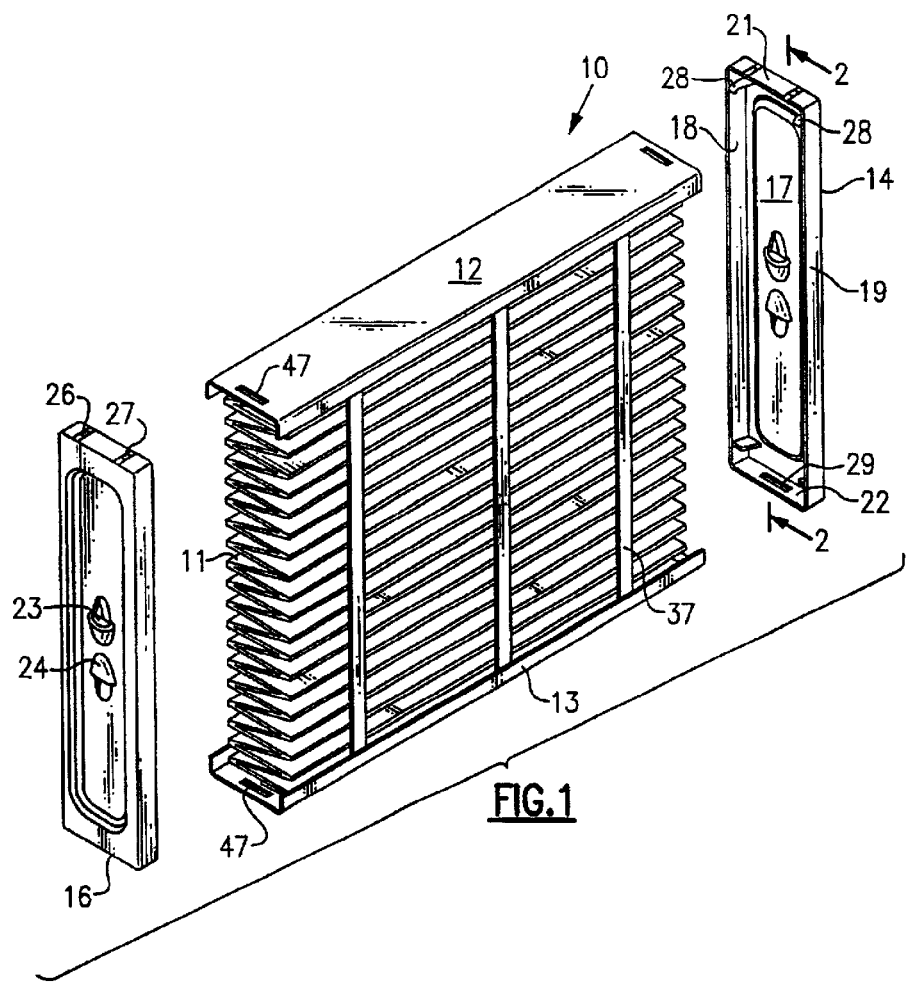
FIG. 1 is an exploded, perspective view of the filter structure in accordance with the present invention.

Referring now to FIG. 1, an air filter structure is shown generally at 10 as comprising a media filter element 11, a pair of end plates 12 and 13, and a pair of side caps 14 and 16. The side caps 14 and 16 are formed of a plastic material and are reusable, whereas the combination of the media filter element 11 and its associated end plates 12 and 13 are made of polypropylene and cardboard materials, respectively, and are intended to be disposable and replaceable at the time when the filter is considered to be "full" or "dirty".

The side caps 14 and 16 are identical and comprise a substantially planer base element 17, normally extending sidewalls 18 and 19, and normally extending end walls 21 and 22, the combination of which defines a cover for receiving one end of the filter element 11 as will be described hereinafter. As part of the base element 17 of each of the side caps 14 and 16, of there are provided a pair of spaced handles or grips 23 and 24 which are molded into the base element 17 as shown. Also, on the outer surfaces of the end walls 21 and 22, there are provided a pair of molded clearance ribs 26 and 27 which serve to reduce sliding friction when the filter assembly is being installed into its operating position within a duct or the like.

Figure 2:
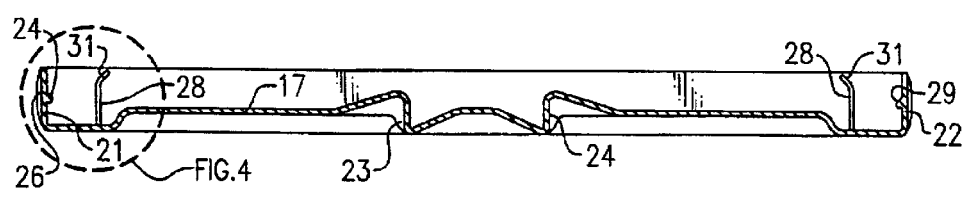
FIG. 2 is a sectional view of an side cap portion of the filter structure as seen along lines 2—2 of FIG. 1.

As shown in FIG. 1 and also in FIG. 2, the side caps 14 and 16 each include at each end thereof a pair of spacer flanges 28 extending normally from the base element 17 and a locking boss 29 on the inner side of the end walls 21 and 22. Each of the spacer flanges 28 includes a beveled portion 31 angled inwardly from the wall, 21 and 22, respectively, as shown in FIG. 2. The spacer flanges 28 are designed to establish and maintain the proper expanse of the filter element 11 when it is installed into the unit in the expanded state, whereas the locking bosses 29 are provided to secure the filter element in its installed position within the side caps 16 and 17 as will be more clearly explained hereinafter.

Figure 3:
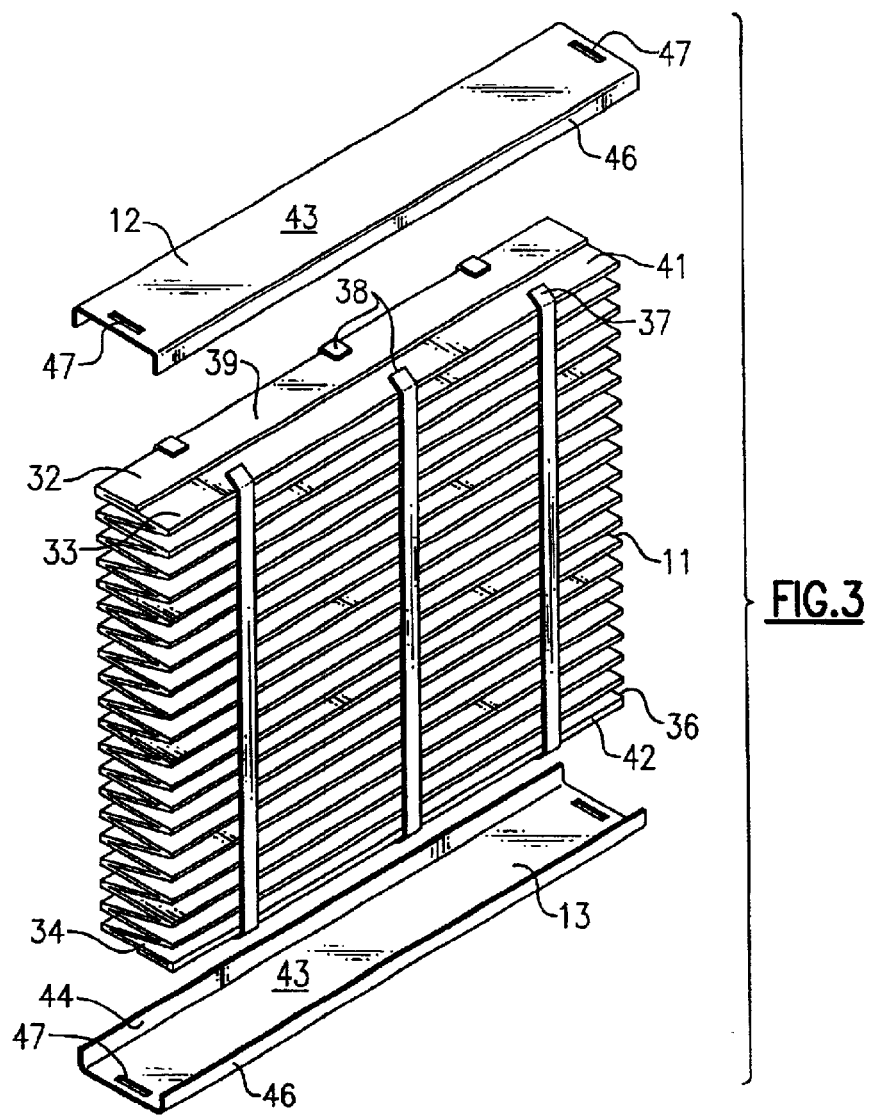
FIG. 3 is an exploded, perspective view of a portion of the filter structure in accordance with the present invention.

Referring now to FIG. 3, the media filter 11 and its associated end plates 12 and 13 are shown in greater detail. The media filter 11 comprises a plurality of pleats 32, with adjacent pleats 32 having their edges 33 integrally connect in accordion-like fashion so as to be collapsible into a tightly stacked condition for storage and shipping, or expandable into an open position as shown for installation and use. The one ends 34 of the various pleats 32 form a plane, and the other ends 36 of the pleats 32 form another plane. The pleats 32 are formed of a porous material which will readily allow the passage of air therethrough with little pressure drop while filtering out any solid particles that may be contained within the flowing air. The materials are preferably relatively inexpensive and biodegradable since this portion of the assembly is designed to be disposable. Any suitable material may be used, but a preferred material is polypropylene.

Attached to the edges 33, on each side of the pleats 32 are a plurality of flexible spacer elements 37 which are connected to the edges 33 of the pleats 32 so as to allow a collapsing of the media filter element 11 for storage and transport, and for the maintenance of a proper spacing of the pleats 32 when the filter element in 11 is in its expanded condition. That is, the spacer elements 37 are so attached to the pleat edges 33 that when the spacer elements 37 are in their expanded condition, the pleat edges 33 are uniformly spaced from their associated adjacent pleat edges 33, and when the filter element 11 is collapsed, the spacer elements portions between the pleat edges 33 will go slack and not interfere with the collapsing of the filter element 11. The spacer elements 37 can be of any flexible material but are preferably in the form of a strand, string, ribbon, or the like, that can be readily and securely affixed to the pleat edges 33 to accomplish the spacing function intended. For purposes of description, the spacer elements 37 are shown as ribbons. A preferred material is one which is relatively inexpensive, of reasonable strength and durability, and is biodegradable, as this is part of the disposable portion of the structure.

The manner in which the spacer elements are affixed to the pleat edges 33 may vary in accordance with the needs and facilities of the manufacture. One approach would be to use an adhesive, while another would be to stitch the elements together. A preferred approach is to use ultrasonic bonding for that purpose as will be described more fully hereinafter.

The number and location of the spacer elements 37 may also be varied in accordance with the needs and desires of the manufacturer. Although the filter element 11 is shown with three equispaced elements on each side of the filter element 11, that number and location may be increased or decreased as desired. However, in order to accommodate ease in installation, it is preferable to have at least one spacer elements 37 on each side of the filter element 11. In addition to attaching the spacer elements to the pleat edges 33, it is also desirable, for purposes of durability, to attach the spacer element overhangs 38 at each end of the spacer elements 37 to the outer side of the respective end pleats 41 and 42 as shown in FIG. 3.

Continuing with the description of FIG. 3, the end plates 12 and 13 are identical and are generally U.-shaped in form, having a body element 43 and two normally extending side elements 44 and 46. Formed in each end of the body 43 is a slot 47 which is used for securing the filter element 11 in its installed position within the side caps as will be more fully described hereinafter. Although the end plates 12 and 13 may be formed of a molded plastic material, or the like, a preferred material is cardboard because of its relatively low-cost and biodegradability. The use of such material for this purpose, however, poses certain problems which were solved in a manner to be described more fully hereinafter.

The end plates 12 and 13 are part of the disposable filter structure 10 and as such are securely fastened to the respective end pleats 41 and 42 by an adhesive or the like. That is, the entire outer side 39 of each of the end pleats 41 and 42 are preferably glued to the inner sides of the respective body elements 43 of the end plates 12 and 13. In doing so, the spacer element overhangs 38 are also captured between the two elements to thereby provide a durable union which remains together for the life of the filter structure 10. The end plates 12 and 13, with their side elements, therefore serve to encase the collapsed media during storage and shipment and to facilitate and maintain expansion of the media during installation and operation.

Figure 4:
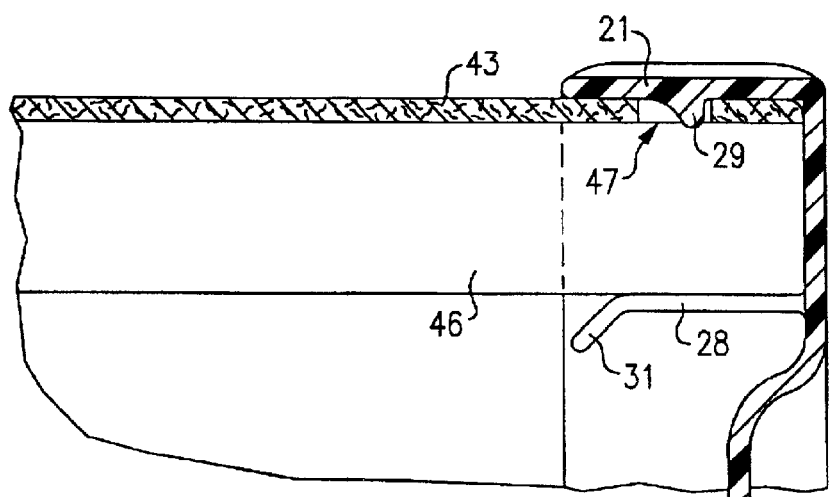
FIG. 4 is a sectional view of a portion of the side cap with a filter element installed therein.

Having described both the disposable filter portion, i.e. the filter structure 10 as shown in FIG. 1, and the reusable side caps 14 and 16 into which they are installed, the manner in which the disposable portion is installed within the side caps will now be described as shown in FIG. 4. To install a disposable filter element, a collapsed filter structure 10 is removed from its packaging and expanded to a fully open position, with the spacer elements 37 being extended to their full-lengths. When the filter structure 10 is in its fully expanded condition, the separation of the end plates 12 and 13 should be such that they should be able to be easily installed in the space between the spacer flange 28 and end wall 21 or 22. That is, the side elements 44 and 46 of each of the end plates 12 and 13 should slide over the beveled portion 31 and onto the spacer flange 28 as shown in FIG. 4. When in the fully installed position, the body element 43 will be fully engaged with the inner side of the end wall 21, such that the boss 29 slips into the slot 47 to secure the filter structure 10 within the side cap. In this position, the pleat ends 34 and 36 are captured in an interference fit within the boxlike structure of the side caps 14 and 16 to form a composite sealed unit which can now be installed in its desired position within a duct or the like. When the filter becomes dirty, the entire assembly can be removed to replace the disposable filter structure 10. Removal can be easily accomplished by slightly compressing the end plates 12 and 13 together so as to disengage the boss 29 from the slot 47 and allow the filter structure 10 to be removed from the side caps 14 and 16.

FIG. 5 shows an alternative embodiment of an side cap 17 wherein, on the outer side thereof, an extended edge is molded around entire perimeter and is seen as a pair of border ribs 48 and 49 which are integrally molded at the respective ends of the side cap 17. The purpose of the ribs 48 and 49 are to extend the depth of the filter assembly to fit a deeper cabinet. In this way, a single filter size may be used in cabinets of various depths by simply changing the side caps, with the side caps selected having ribs 48 and 49 which are of the appropriate length to extend across the depth of the cabinet.

As mentioned hereinabove, the spacer elements 37 are secured to the pleat edges 33 by way of an ultrasonic bonding process. That process will now be described with reference to FIG. 6. A conveyor belt or continuous chain 51 with a sawtooth form corresponding to the size and shape of the pleated filter material is provided as shown, with motor drive means (not shown) to cause it to rotate in a clockwise direction. A first ultrasonic welder 52 is provided on the upper side of the conveyor belt, and a first backup device 53 is provided below the conveyor belt, opposite the welder 52. This welder is used to ultrasonically bond the spacer elements 37 to the upper side of the media filter material as it passes through the welding apparatus. Similarly, a second ultrasonic welder 54 located below the conveyor belt, and a second backup device 56, located above the conveyor belt, are used to ultrasonically bond the spacer element 37 to the opposite side of the media filter material.

As a first step in the process, the filter media goes through a laminating process wherein a wire mesh support is attached to one side thereof, with the combination then going through a pleating machine to form pleats to the desired depth. This is a common process in the manufacture of pleated filters. The pleated media 11 is then fed into the welding apparatus from the left side thereof, in an expanded condition, as shown. As it proceeds along the conveyor belt, the ribbons which act as spacer elements 37 are then introduced on each side of the media as shown. Thus, an upper ribbon 57 coming off of a spool 58 is extended along the upper side of the expanded pleated material, and a lower ribbon 59 coming off of a spool 61 is extended along the lower side of the expanded pleated material. As the edges of the pleated material, with its overlaid ribbon, pass through the welding apparatus, the two welders operate to ultrasonically weld the ribbon to each edge of the media material. This is accomplished on the upper side, for example, by the backup device 53 being pneumatically raised to a position directly below the peak or edge of the pleated material to provide support thereof, and the welder 52 being pneumatically lowered to momentarily engage the ribbon and press it against the edge of the pleated material. During engagement, the welder 52 causes ultrasonic vibrations within both the ribbon and the pleated material, thereby causing both of them to heat up and bond to each other. The backup device 53 is then retracted, the welder is raised slightly, and in the pleated material is advanced to the next edge so that in the process can be repeated. Meanwhile, the same process is occurring at the other (lower) side of the media material by the welder 54 and backup device 56. The result is a pleated material being delivered at the right side of the welding apparatus, with ribbons 57 and 59 being attached to each edge thereof so as to thereby establish a uniform maximum spacing of the pleats when in the expanded condition. That expanded filter material can then be cut to the desired length, attached to end plates at either end thereof, and then be collapsed for storage and shipping.

Whereas the process as just described was applied to bond a single ribbon on each side of the media material, it will be understood that the same process can be extended to simultaneously weld a plurality of ribbons on each side of the media material. Also, even though the process as described includes the steps of expanding the media and extending the ribbon across the expanded edges, it is also possible to present the pleated material in a collapsed or partially collapsed condition for the welding process. This approach would require a similar collapsing of the ribbon in order to obtain the proper spacing relationship with the pleat edges, but may allow the simultaneous welding of a plurality of edges with a single welder.

Figure 7:
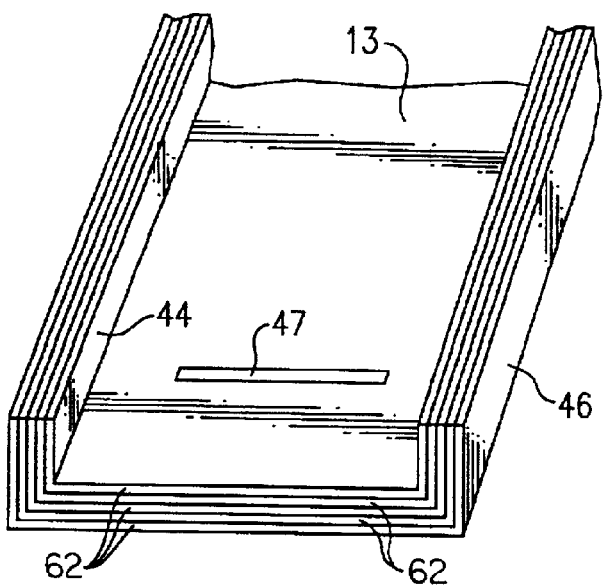
FIG. 7 is a partial perspective view of an end plate portion of the filter assembly in accordance with the present invention.

Having generally described the end plates 12 and 13 in design and function, the specific design structure will now be described with reference to end plate 13 as shown in FIG. 7. As will be seen, the end plates are constructed of a plurality of layers 62 of a natural fibrous material such as paperboard or cardboard, with the layers 62 being laminated by bonding and compressing at high pressures the individual layers into the final U-shaped form to provide a rigid, strong and durable structure that will withstand the demands of intended use. A suitable structure has been found to result from the use of 6–10 layers of approximately 0.015 in. thickness paperboard that are adhesively bonded together with a water-based glue. The outer layer may have a clay coating in order to obtain a low-cost, high contrast, white surface for the printing of instructions and other information.

Such a laminated construction of the end plates provides the strength and rigidity to prevent sagging of the unsupported middle portion thereof, and its shape retention capability facilitates the easy insertion into and locking into place within the side caps as described hereinabove. At the same time, it is sufficiently flexible to allow it to be pushed in to unlatch it from the side caps for purposes of replacement. The natural materials from which it is made are biodegradable and therefore easily disposable.

Figure 8:
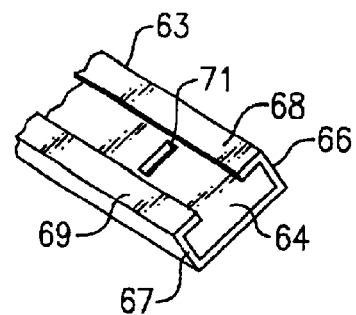
FIG. 8 is a partial perspective view of a modified embodiment of the end plate portion of the filter.

Referring now to FIG. 8 an alternative embodiment of the end plate is shown at 63 to include a body element 64, side elements 66 and 67, and hangar elements 68 and 69 to form a C-shaped element. A slot 71 is formed in the body element 64, at each end thereof, in the same way as described hereinabove with respect to end plates 12 and 13. However, here the end plate 63 does not form an integral part of the disposable filter assembly but is rather a nondisposable part that is used not only to support the disposable media filter element 11 but also to selectively provide a storage container for portions thereof in order to accommodate the needs of an installer in meeting the requirements of multiple sized openings. This will be more clearly seen with reference to FIGS. 9 & 10.

Figure 9:
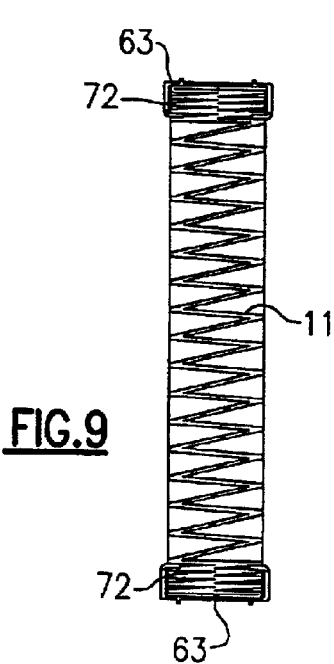
FIGS. 9 and 10 are schematic illustrations of the filter element as installed in a modified embodiment of the end plate.
Figure 10:
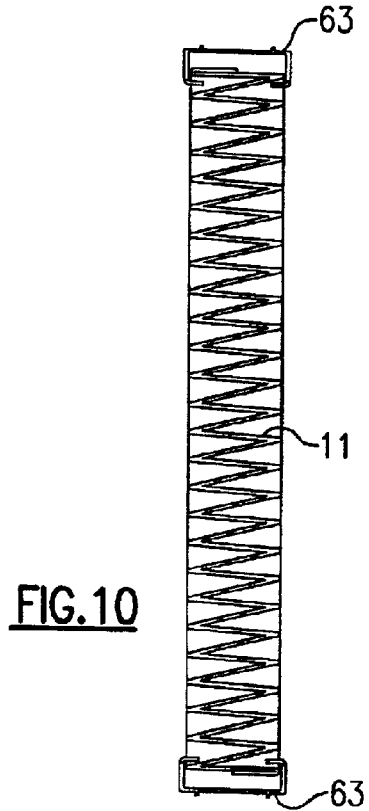

If a service person can carry a single filter size for installation in various sized cabinets, he can reduce his inventory to save space and money. That is, filters for residential use are generally of one of three sizes: 16×25 in., 20×25 in., or 24×25 in. If a service person can carry only the 24×25 in. filter and use them for all installations, it will be to his benefit. The present design of the end plate 63 will allow this to occur. Referring to FIGS. 9 & 10, a single media filter element 11, having dimensions of 24×25 in., for example, is used in its entirety for installation in a 24×25 in. opening as shown in FIG. 10, and is partially used in a 16×25 in. opening as shown in FIG. 9, with the remaining unused portion being stored in the end plates 63 as shown.

The disposable filter 11 includes no integral end plates but only the plurality of folded pleats as described hereinabove. Such a filter is installed into the two end plates by simply inserting the end panels into the respective end plates and sliding them in. This is shown in FIG. 10 wherein only a single end panel is captured within the respective end plates 63, with the hangar elements 68 and 69 providing the necessary support to maintain the filter in its expanded condition when the end plates 63 are installed into the side caps as described hereinabove. In the FIG. 9 installation, wherein the opening is only 16×25 in., a portion of the pleats 72 remain in their collapsed condition and are collectively installed into the end plates as shown. Similarly, for use in an opening of 16×20 in., a smaller portion of the pleats 72 would remain in their collapsed condition and be inserted into the end plates 63. In each case, however, the operative, expanded portion of the filter element 11 would be fully expanded as shown.

Since the C-shaped end plates 63 are designed for re-use, they are preferably composed of a more robust material. Whereas it may be possible to form the C-shaped element in a laminated material as described hereinabove, a molded plastic or a light metal material is preferred. Further, it may take various forms and still provide the same function. For example, the hangar elements 68 and 69 do not need to be continuous along the lengths of the end plates 63 as shown, but only need to provide support at various points along the length and can therefore be discontinuous or simply be a plurality of brackets attached to the side elements 66 and 67. Also, whereas the end plates 63 have been shown and described as open-ended to facilitate the easy insertion of the end pleats therein, they may be closed to provide greater strength, with the end pleats then being installed in another manner such as by installing one edge of the pleat and then flexing the pleat in order to install the other edge thereof.

What is claimed is:

1. A filter assembly comprising:
   an expandable pleated media filter having a plurality of filter panels with adjacent panels being interconnected at their edges and having two end panels;
   a pair of end plates, each having a central body element, two side elements and two hanger elements that form a C-shaped cross-section for supportively receiving the entirety of at least one of said end panels therein; and
   attachment means associated with each of said end plates for mounting said end plates to a support structure to maintain said filter in an expanded condition.

2. A filter assembly as set forth in claim 1 wherein said end panels rest on and are supported by said two hanger elements.

3. A filter assembly as set forth in claim 1 wherein said at least one end panel is slidably received into said end plate.

4. A filter assembly as set forth in claim 1 wherein the length of said the side elements are such that the distance between said body element and two hanger elements are sufficient to receive the entirety of a plurality of unexpended panels therein, and said at least one end panel also includes the entirety of at least one other panel.

5. A filter assembly as set forth in claim 1 wherein said attachment means comprises a slot formed near each end of said body element.

6. A method of installing an expandable pleated media filter having a plurality of filter panels with adjacent panels being interconnected at their edges and having two end panels, comprising the steps of:
   providing a pair of end plates, each having a central body element two side elements and two hanger elements that form a C-shaped cross-section;
   inserting the entirety of at least one of said end panels into each of said C-shaped end plates such that said two hanger elements provide support for aid end panels when said filter is in an expanded condition; and
   attaching said end plates to a support structure for maintaining said filter in an expanded condition.

7. A method as set forth in claim 6 wherein said inserting step comprises the step of sliding at least one end panel into an end of said end plate.

8. A method as set forth in claim 6 wherein the length of said side elements are such that the distance between said body element and two hanger elements are sufficient to receive the entirety of a plurality of unexpended panels therein and further wherein said inserting step include the step of also inserting the entirety of at least one other panel into each of said end plates.

* * * * *